United States Patent [19]

Lucas et al.

[11] Patent Number: 5,603,811
[45] Date of Patent: Feb. 18, 1997

[54] PROCESS FOR THE TREATMENT OF AN AQUEOUS SOLUTION MAINLY CONTAINING NITRIC ACID AND HYDROFLUORIC ACID

[75] Inventors: Philippe Lucas, Paris; Jean-Paul Moulin, Bois d'Arcy; Olivier Halna du Fretay, Pont Saint Esprit; Joseph Roussel, Beaumes de Venise; Jany Petit, Sérignan Du-Comtat; Claude Saintouil, Suze La Rousse; Claude Toussaint, Orange, all of France

[73] Assignee: Cogema -Compagnie Generale Des Matieres Nucleaires, Velizy Villancoublay, France

[21] Appl. No.: 210,412

[22] Filed: Mar. 18, 1994

Related U.S. Application Data

[63] Continuation of Ser. No. 924,046, filed as PCT/FR91/00226, Mar. 20, 1991 published as WO91/14655, Oct. 3, 1991, abandoned.

[30]     Foreign Application Priority Data

Mar. 21, 1990 [FR]    France .................................. 90 03639

[51] Int. Cl.$^6$ ................................ B01D 3/10; B01D 3/36
[52] U.S. Cl. .................................... 203/12; 159/DIG. 19; 159/DIG. 15; 203/13; 203/78; 203/80; 203/86; 423/394.2; 423/488
[58] Field of Search .................................. 203/13, 12, 78, 203/86, 80, 50; 423/488, 483, 390.1, 394.2; 252/DIG. 9; 159/DIG. 19, DIG. 15; 202/267.1, 173

[56]            References Cited

U.S. PATENT DOCUMENTS 3,846,256  11/1974  Dietrich ..................................... 203/33
3,852,412  12/1974  Brenner ..................................... 203/13
3,971,845  7/1976   Becker et al. ........................... 423/488
4,144,092  3/1979   Krepler ..................................... 203/48
4,892,625  1/1990   Shimizu et al. ........................... 203/86
5,334,784  8/1994   Blake et al. ............................. 570/165

FOREIGN PATENT DOCUMENTS 0657056   2/1963   Canada ..................................... 203/13
2303761   10/1976  France .
1060850   7/1959   Germany ................................... 203/13
1092656   4/1989   Japan .
2144101   6/1990   Japan .

OTHER PUBLICATIONS

Ca 113 (24):223598d, 1989.

Ca 112 (20):181981j 1989.

Ca 85 (12): 82934Z, 1976.

CA 89(22): 185490p, 1978.

CA 90(2): 12963n, 1977.

CA 101(8): 590256, 1984.

CA 95 (20): 177461p, 1981.

Patent Abstracts of Japan, vol. 2, No. 71, (M–78), 30 May 1978 & JP, A, 53036964 (Hitachi Seisakusho K. K.) 4 May 1978.

*Primary Examiner*—Virginia Manoharan
*Attorney, Agent, or Firm*—Oblon, Spivak, McClelland, Maier & Neustadt, P.C.

[57]            ABSTRACT

A process for treating an aqueous solution mainly containing nitric acid and hydrofluoric acid. The process involves distilling to provide an aqueous solution concentrated in nitric acid and hydrofluoric acid for the separation thereof, then separating by distillation.

5 Claims, 1 Drawing Sheet

5,603,811

PROCESS FOR THE TREATMENT OF AN AQUEOUS SOLUTION MAINLY CONTAINING NITRIC ACID AND HYDROFLUORIC ACID

This application is a Continuation of application Ser. No. 07/924,046, filed as PCT/FR91/00226, Mar. 20, 1991 published as WO91/14655, Oct. 3, 1991 now abandoned.

BACKGROUND OF THE INVENTION

1. Field of the Invention

The present invention relates to a process For the treatment of an aqueous solution mainly containing nitric acid and hydrofluoric acid.

Such solutions can in particular consist of industrial effluents such as metal cleaning baths or can be produced in operations during the nuclear fuel cycle.

The invention proposes a process for the treatment of such solutions making it possible to recover on the one hand the two separate acids, which can thus be recycled, and on the other hand a water purified with respect to said two acids. Such a water can be discharged into the environment if it contains no other contaminating substances.

2. Description of the Invention

The treatment of aqueous solutions containing nitric acid and hydrofluoric acid by distillation is made difficult by the properties of the liquid-vapor equilibrium of the mixture of the two acids.

It is also pointed out that the liquid-vapor equilibrium data on this system only relate to mixtures containing traces of hydrofluoric acid or, at the most, 4M hydrofluoric acid solutions. The literature does not provide information on hydrofluoric acid-concentrated mixtures.

U.S. Pat. No. 3,846,256 describes a process for the purification of nitric acid by the elimination of the fluoride ions contained therein. This process is based on the use of metal ions such as zirconium and aluminium ions. Therefore the volatility of the hydrofluoric acid is lowered by the formation of complexes of the fluoride ion of the metals in question and the separation of a mixture of nitric acid and water by evaporation is then possible. Thus, this process makes it possible to purify the nitric acid, but it suffers from two disadvantages. On the one hand it leads to obtaining a salt-containing effluent and on the other it does not permit the separation and therefore the valorization of hydrofluoric acid.

It has also been proposed to introduce silica for increasing the volatility of the hydrofluoric acid by the formation of fluosilicic acid. According to this method, the hydrofluoric acid is also polluted and cannot therefore be volatilized. The said method is also mainly performed in discontinuous operations, essentially for analytical purposes.

SUMMARY OF THE INVENTION

According to the invention the problem is considered from a new angle and it is proposed to work in a medium concentrated with the two acids. Thus, by a distillation operation, it is then possible to separate said two acids from an aqueous solution.

The process according to the invention is therefore characterized in that it includes an operation of distilling an aqueous solution concentrated with said two acids in order to separate them.

DETAILED DESCRIPTION OF THE PREFERRED EMBODIMENTS

Figure 1:
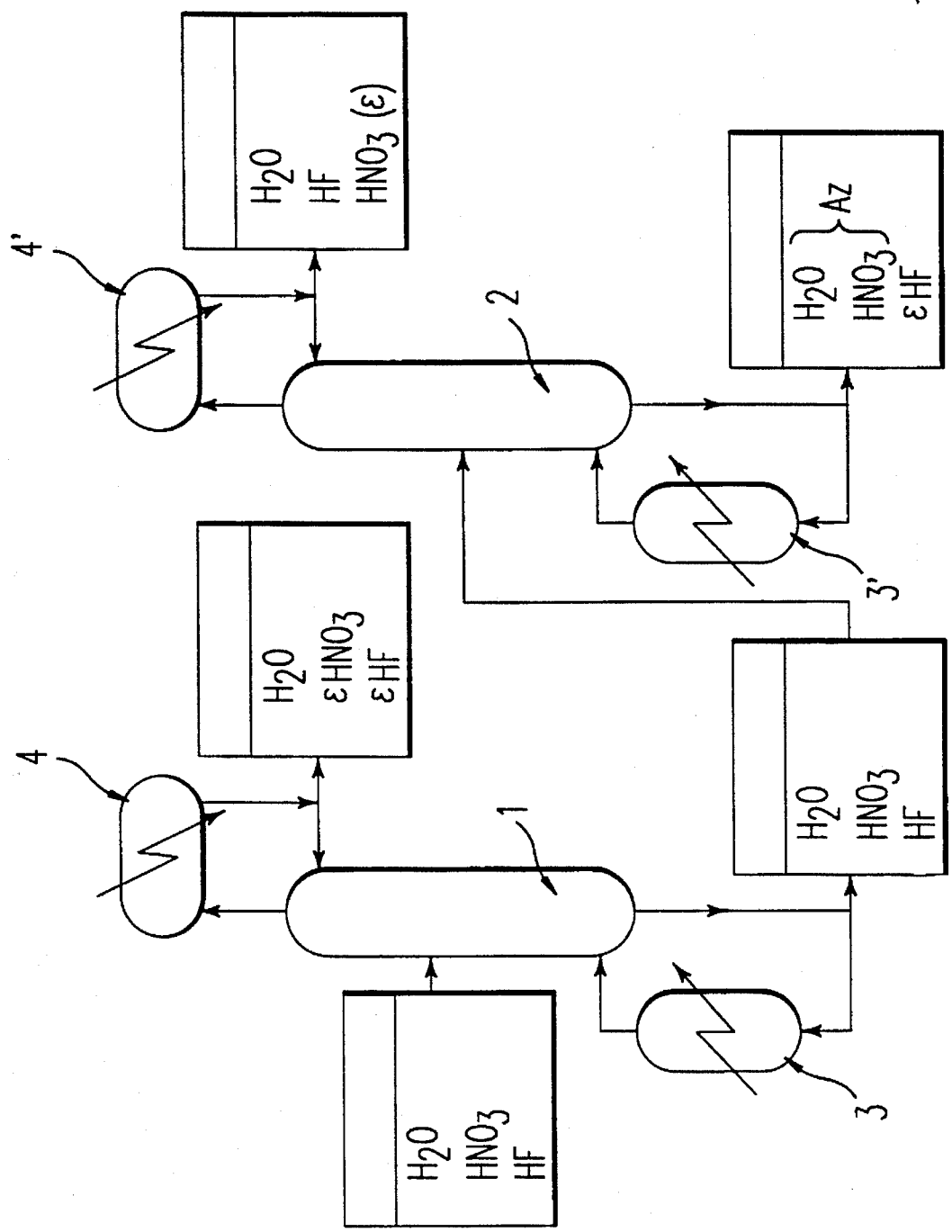
FIG. 1 illustrates an apparatus of the present invention.

It would therefore appear that the relative volatility of hydrofluoric acid compared with nitric acid increases in a nitric and hydrofluoric medium as the water content decreases. In particular, in the vicinity of the water nitric acid azeotrope, the water-hydrofluoric acid azeotrope and their mixtures, said relative volatility exceeds unity.

Thus, according to the invention, it is proposed to distill an aqueous solution concentrated with said nitric and hydrofluoric acids. The distillation residue obtained undergoes hydrofluoric acid purification, whilst the distillate is highly enriched with said hydrofluoric acid. The more the concentrate to be distilled is concentrated with acids, the more the two separately obtained acids have a low water content.

The process according to the invention is particularly interesting when carried out with an aqueous solution concentrated with said two acids, whose composition is close to that of a mixture of the two nitric acid-water and hydrofluoric acid-azeotropes.

The concentrated aqueous solution to be distilled according to the invention consists of the aqueous solution to be treated or, more generally, is obtained therefrom.

Prior to the distillation operation according to the invention, the solution to be treated must generally undergo a concentration with said two acids. This concentration can result from the performance of any known process.

The solution concentrated with said two acids and which is to be distilled according to the invention can in particular be obtained by subjecting the aqueous solution to be treated to a prior distillation operation.

With the aim of obtaining at the end of said first distillation operation a solution having the maximum concentration of said two acids for an optimum separation of these two acids during the second distillation operation, the parameters of said first distillation operation are optimized. During it, it is appropriate to eliminate most of the water contained in the aqueous solution to be treated. Thus, the aim is to obtain a concentrate having a composition close to that of a mixture of the two nitric acid-water and hydrofluoric acid-water azeotropes.

According to a preferred variant of the invention, the two distillation operations are carried out in series in the same installation.

The two successive distillation operations can lead to the obtaining of three products:

a residual water purified with respect to the two acids and which may possibly be discharged into the environment (said residual water constituting the distillate of the first distillation operation, the distillation residue having a composition close to that of a mixture of the two nitric acid-water and hydrofluoric acid-water azeotropes);

an aqueous nitric acid solution with a concentration close to the nitric acid-water azeotrope (more than 55 mass % nitric acid) and purified with respect to the hydrofluoric acid, said solution constituting the residue of the second distillation operation;

an aqueous hydrofluoric acid solution with a concentration close to the hydrofluoric acid-water azeotrope (more than 25 molar % hydrofluoric acid) and containing less than 5 molar % of nitric acid, said solution constituting the distillate of the second distillation operation.

Thus, the process according to the invention makes it possible to purify the initial solution and separate the two acids.

The parameters for the distillation operation or operations, namely the pressure, number of plates, reflux rate, vaporizing rate, boiler temperatures, etc. are calculated without any particular difficulty, as a function of the desired separation quality. This also applies with respect to the parameters of a prior effluent concentration stage, other than a distillation operation.

The pressure in the installation or process according to the invention is chosen as a function of the materials used, so as to operate at temperatures compatible with the mechanical strength and corrosion resistance of said materials. The inventive process is advantageously performed under a reduced pressure. Therefore the construction material must be mechanically and chemically strong under the chosen operating conditions. In particular, corrosion phenomena must not lead to the presence in the solution of metal ions liable to complex fluorides or reduce the volatility of the hydrofluoric acid.

However, the process according to the invention is suitable for treating solutions containing metal ions having a limited complexing action with respect to fluoride ions. In this case, these impurities integrally occur in the nitric acid solution purified with respect to the hydrofluoric acid.

The construction material in question is advantageously chosen from among noble metals such as platinum, as well as polymers having a high mechanical, chemical and thermal resistance or strength such as polyvinyl difluoride. Particular preference is given to the latter material, which has the highest mechanical strength above 100° C.

The preferred variant of the invention will now be described in conjunction with the single attached drawing, which diagrammatically shows an apparatus for performing the process.

The apparatus comprises two distillation columns 1, 2 and operates continuously. In the first column 1 elimination takes place of most of the water contained in the feed liquor. The temperature in the boiler 3 is the boiling point of the concentrate 1 at the considered pressure. The concentrate 1 is highly purified as regards nitric and hydrofluoric acids. It can be discharged into the environment. The residue of said first column constitutes the concentrate 1 and has a composition close to that of a mixture of nitric acid-water and hydrofluoric acid-water azeotropes.

The concentrate 1 is treated in the second distillation column 2, its boiler being shown at 3' and its condenser at 4'. At the head of said column recovery takes place of the hydrofluoric acid-water azeotrope. The residue 2 undergoes hydrofluoric acid purification. Its composition is close to that of the nitric acid-water azeotrope. The distillate 2 contains a mixture of water, hydrofluoric acid and nitric acid. Its molar fraction in hydrofluoric acid generally exceeds 0.25 and that of nitric acid is below 0.05.

The following example illustrates the process according to the invention.

It is proposed to carry out this process on an effluent (aqueous solution) containing as a mass fraction 12.7% nitric acid and 0.3% hydrofluoric acid in order to obtain on the one hand a residual water containing less than 100 mg/l of hydrofluoric acid and less than 3 g/l of nitric acid and on the other hand nitric acid containing less than 10 mg/l of hydrofluoric acid.

The above results are obtained under the following operating conditions. The effluent is treated in an installation comprising two distillation columns in series:

the first column is formed by about 10 theoretical plates, the supply being located on the second plate, the plates being counted from the column head and at the head the reflux rate is approximately 0.6;

the second column is constituted by about 20 theoretical plates, the supply being located on the third plate and the reflux raze at the head is approximately 17;

the equipments are made from polyvinyl difluoride (PVDf);

the operations are performed under reduced pressure (50 mm Hg);

under these conditions, the extreme temperature values are approximately 38° and 60° C. in the first column and 50° and 60° C. in the second.

We claim:

1. A process for separating nitric acid and hydrofluoric acid from an effluent aqueous solution, comprising nitric acid and hydrofluoric acid, which process comprises:

a) distilling said effluent aqueous solution comprising nitric acid and hydrofluoric acid to obtain residual water containing less than 100 mg/l hydrofluoric acid and less than 3 g/l nitric acid as a distillate, and a concentrate which consists of a mixture of nitric acid-water azeotrope and hydrofluoric acid-water azeotrope; and b) distilling said concentrate, thereby obtaining a hydrofluoric acid-rich solution distillate consisting of hydrofluoric acid-water azeotrope containing more than 25 mol % of hydrofluoric acid and less than 5 mol % of nitric acid and a nitric acid-rich distillation residue containing more than 55% by wt. of nitric acid and less than 25 mol % of hydrofluoric acid.

2. The process according to claim 1, wherein the two distillation operations of a) and b) are performed in series in the same installation.

3. The process according to claim 1, wherein the two distillation operations of a) and b) are carried out under reduced pressure.

4. The process according to claim 1, wherein said distilling to obtain a hydrofluoric acid-rich solution distillate and a nitric acid-rich distillation residue is performed in a distillation apparatus made of a material selected from the group consisting of platinum and polyvinyl difluoride.

5. The process according to claim 4, wherein said material is polyvinyl difluoride.

* * * * *